United States Patent
Mabe et al.

(10) Patent No.: US 10,053,239 B2
(45) Date of Patent: Aug. 21, 2018

(54) THERMALLY GRADED ADAPTIVE MULTIFUNCTIONAL CELLULAR STRUCTURES WITH SHAPE MEMORY ALLOYS

(71) Applicant: The Boeing Company, Chicago, IL (US)

(72) Inventors: James H. Mabe, St. Louis, MO (US); Ali Yousefiani, Irvine, CA (US)

(73) Assignee: The Boeing Company, Chicago, IL (US)

( * ) Notice: Subject to any disclaimer, the term of this patent is extended or adjusted under 35 U.S.C. 154(b) by 269 days.

(21) Appl. No.: 14/848,393

(22) Filed: Sep. 9, 2015

(65) Prior Publication Data

US 2017/0066519 A1 Mar. 9, 2017

(51) Int. Cl.
| | |
|---|---|
| *B64C 3/44* | (2006.01) |
| *B64G 1/22* | (2006.01) |
| *B32B 15/01* | (2006.01) |
| *B32B 3/28* | (2006.01) |
| *B32B 7/04* | (2006.01) |
| *F03G 7/06* | (2006.01) |
| *B64C 1/06* | (2006.01) |
| *F02K 1/06* | (2006.01) |
| *F02K 1/10* | (2006.01) |

(52) U.S. Cl.
CPC .................. *B64G 1/22* (2013.01); *B32B 3/28* (2013.01); *B32B 7/045* (2013.01); *B32B 15/01* (2013.01); *B64C 1/061* (2013.01); *F02K 1/06* (2013.01); *F02K 1/10* (2013.01); *F03G 7/065* (2013.01); *B32B 2250/03* (2013.01); *B32B 2307/302* (2013.01); *B32B 2307/732* (2013.01); *B32B 2605/18* (2013.01); *F05D 2300/505* (2013.01); *Y02T 50/672* (2013.01)

(58) Field of Classification Search
CPC .. B64G 1/22; B64C 3/38; B64C 3/385; B64C 3/40; B64C 2003/38; F03G 7/065; B32B 2250/03; B32B 2307/302; B32B 2307/732; B32B 2605/18; B32B 15/01; B32B 3/28; F02K 1/06; F02K 1/10; C22F 1/006

See application file for complete search history.

(56) References Cited

U.S. PATENT DOCUMENTS

| | | | | |
|---|---|---|---|---|
| 5,114,104 A | * | 5/1992 | Cincotta | ............. B64C 3/48 114/152 |
| 7,288,326 B2 | * | 10/2007 | Elzey | ............. C22F 1/006 428/179 |

(Continued)

*Primary Examiner* — Philip J Bonzell
(74) *Attorney, Agent, or Firm* — Perman & Green, LLP

(57) ABSTRACT

In one or more aspects of the present disclosure, an aerospace vehicle includes a frame, an actuable multifunctional cellular structure connected to the frame, the actuable multifunctional cellular structure including a first face member and a second face member, and a shape memory alloy core coupled to the first face member and the second face member, and wherein, at least one of the first face member and the second face member is a graded thermal structure configured so that heat transferred through the graded thermal structure in a predetermined thermal pattern to the shape memory alloy core effects a predetermined change in a shape of the shape memory alloy core and effects a change in shape of the actuable multifunctional cellular structure.

20 Claims, 11 Drawing Sheets

(56) References Cited

U.S. PATENT DOCUMENTS

| | | | | |
|---|---|---|---|---|
| 7,550,189 B1* | 6/2009 | McKnight | ................. | B32B 3/10 |
| | | | | 148/563 |
| 7,669,799 B2* | 3/2010 | Elzey | ....................... | B32B 3/28 |
| | | | | 244/123.12 |
| 7,892,630 B1* | 2/2011 | McKnight | ................. | B32B 3/10 |
| | | | | 428/114 |
| 7,958,733 B2* | 6/2011 | Turner | ................... | F02K 1/386 |
| | | | | 60/770 |
| 8,434,293 B2* | 5/2013 | Widdle, Jr. | ............... | F02K 1/10 |
| | | | | 239/265.19 |
| 8,683,807 B2* | 4/2014 | Turner | ................... | F02K 1/386 |
| | | | | 239/265.19 |
| 9,776,705 B2* | 10/2017 | Dilligan | ................... | B64C 3/48 |
| 2008/0006353 A1* | 1/2008 | Elzey | ...................... | C22F 1/006 |
| | | | | 148/563 |
| 2016/0023406 A1* | 1/2016 | Shome | ................... | B29C 70/54 |
| | | | | 156/221 |
| 2016/0052226 A1* | 2/2016 | Oehler | ..................... | B32B 3/30 |
| | | | | 428/167 |

* cited by examiner

THERMALLY GRADED ADAPTIVE MULTIFUNCTIONAL CELLULAR STRUCTURES WITH SHAPE MEMORY ALLOYS

FIELD

The aspects of exemplary embodiment generally relate to adaptive multifunctional cellular aerospace vehicle structures, more particularly, to adaptive multifunctional cellular aerospace vehicle structures with shape memory alloy actuation.

BACKGROUND

Aerospace vehicle often experience a variety of different flight conditions at various stages of a flight. At each of the different flight conditions, an aerospace vehicle produces varying amounts of audible noise and turbulent drag caused by the flow of air around the aerospace vehicle surface based on a number of factors such as, for example, velocity, temperature, air pressure, turbulence and other properties of the air and exhaust. For example, it has been shown that the capability to modify the shape of engine nozzles and inlets, wing leading and trailing edges, or airframe shapes in flight would significantly improve overall performance. For this reason, the optimal shapes, contours and configurations for an aerospace vehicle change during the course of flight based upon the different flight conditions experienced by the aerospace vehicle. Further, various surfaces of the aerospace vehicles often experience extreme conditions during various stages of flight such as extreme temperatures (for example, from engine outlets or, in the case of spacecraft, from re-entry) and extreme pressures. Conventional solutions are often complex assemblies, for example, variable exhaust nozzles on fighter aircraft. Conventional applications use conventional heavy hydraulic actuators that are isolated from the high temperatures and use heavy and complicated kinematic mechanisms to transfer the hydraulic actuators' output to move high temperature surfaces. The high temperature surfaces are often made of expensive alloys and materials. Thus, it may be desirable for an aerostructure that is dynamically reconfigurable to adapt to changing flight conditions, while also being adaptable to extreme conditions experienced by the aerostructure during changing flight conditions. Additionally, to address the ever increasing thermostructural performance goals of the aerospace industry it is desirable for such an aerostructure to simultaneously be lightweight and capable of performing thermal management (e.g. thermal protection or localized heat transfer). Many aerospace vehicles, structures, and systems would benefit from the multifunctional ability to adapt and optimize the structures' shape and properties for each segment of a flight or mission, while maintaining a light weight and also performing various thermal management tasks. For applications in extreme thermal environments, such as near engines or in very high speed flight (e.g. supersonic and/or hypersonic flight), or during re-entry into a planetary atmosphere, conventional actuators may be either too large and heavy or cannot survive, for example, the high temperatures. The combination of exceptionally high stiffness-to-weight ratio, thermal, and acoustic properties of metallic/ceramic/hybrid cellular sandwich structures makes them ideal candidates for addressing the ever increasing thermostructural performance goals of the aerospace industry, while allowing for the necessary multifunctional attributes to be designed into an adaptive aerostructure, as described subsequently.

SUMMARY

Accordingly, a system and method, intended to address the above-identified concerns, would find utility.

In one or more aspects of the present disclosure, an aerospace vehicle includes a frame, an actuable multifunctional cellular structure connected to the frame, the actuable multifunctional cellular structure including a first face member and a second face member, and a shape memory alloy core coupled to the first face member and the second face member, and wherein, at least one of the first face member and the second face member is a graded thermal structure configured so that heat transferred through the graded thermal structure in a predetermined thermal pattern to the shape memory alloy core effects a predetermined change in a shape of the shape memory alloy core and effects a change in shape of the actuable multifunctional cellular structure.

In one or more aspects of the present disclosure, an actuable multifunctional cellular structure includes a first and a second face member, a shape memory alloy core coupled to the first and second face member, and wherein, at least one of the first and second face members is a graded thermal structure with thermal characteristics that effect a predetermined change in a shape of the shape memory alloy core.

In one or more aspects of the present disclosure, a method for morphing a multifunctional cellular aerostructure includes heating one or more of a first and a second face member to transfer heat to a shape memory alloy core through a graded thermal structure in a predetermined heat transfer pattern, and morphing, through the predetermined heat transfer pattern, the multifunctional cellular aerostructure where the predetermined heat transfer pattern effects a change in a shape of the shape memory alloy core and one of the first and second face members interfaces with a fluid flow over the multifunctional cellular aerostructure.

BRIEF DESCRIPTION OF THE DRAWINGS

Figure 1:
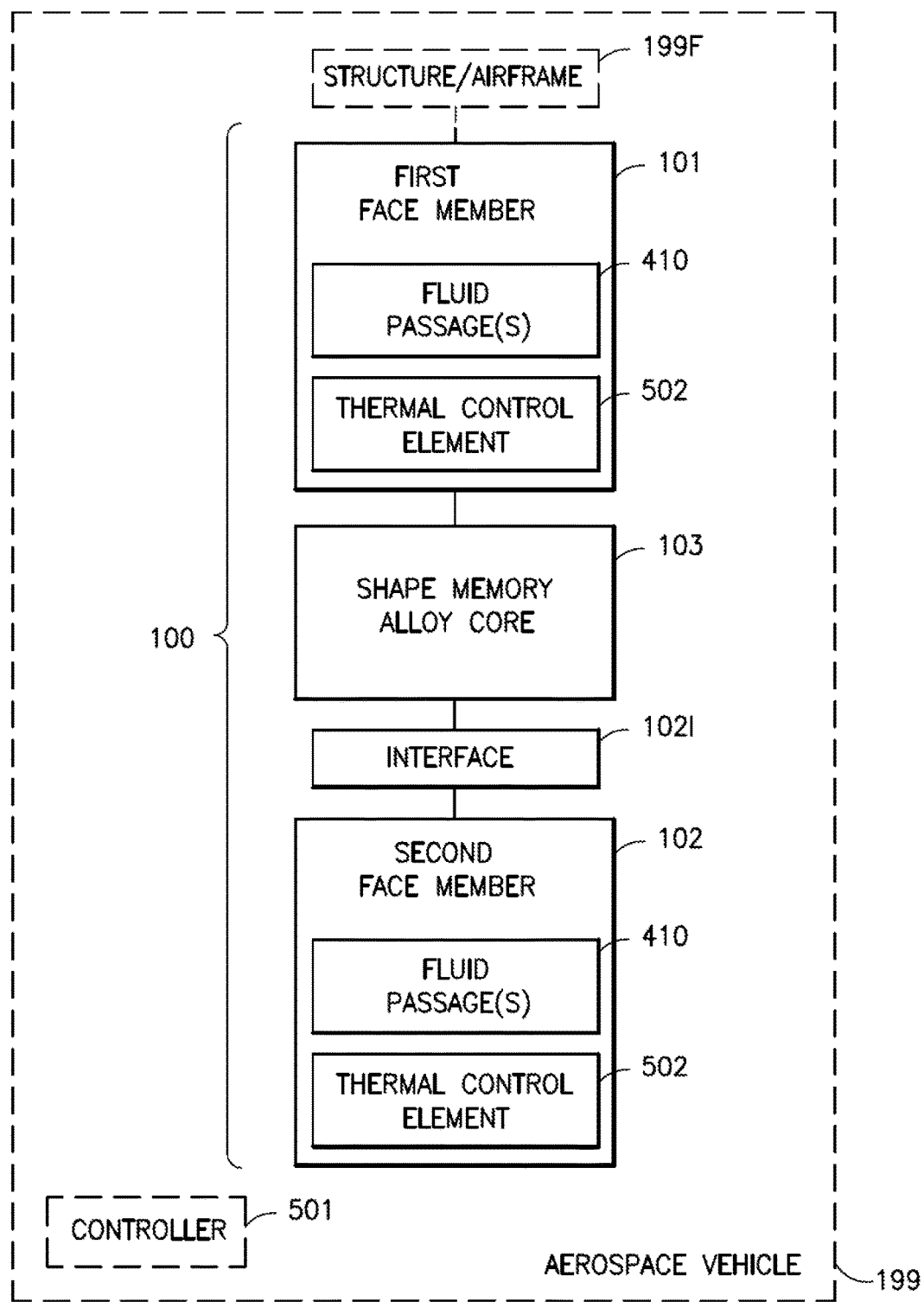
Figure 1A:
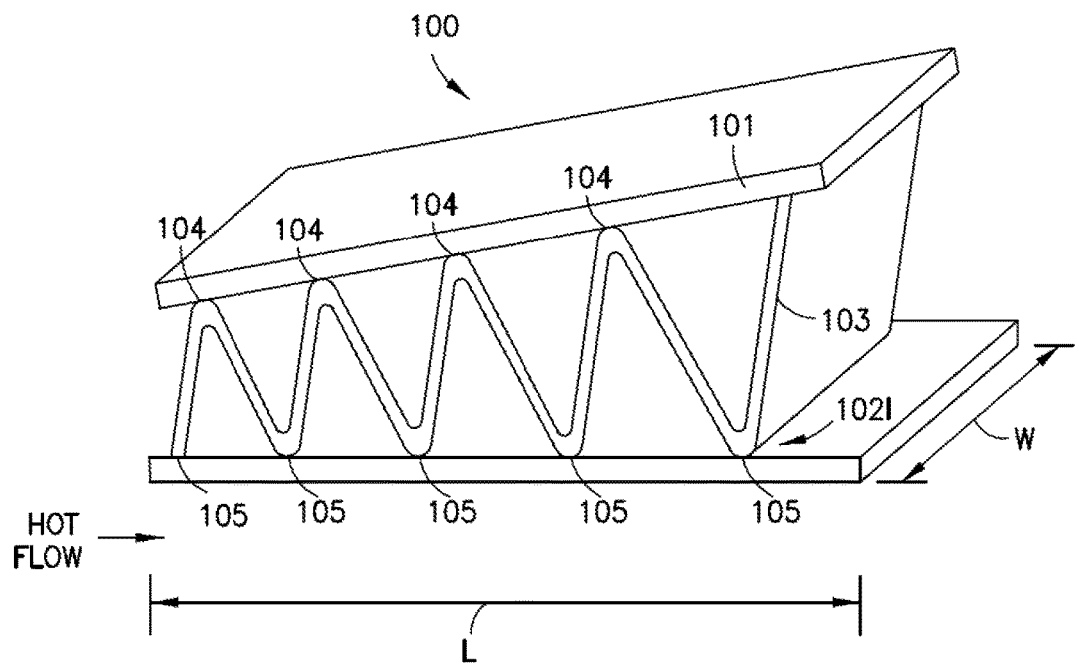
Figure 1B:
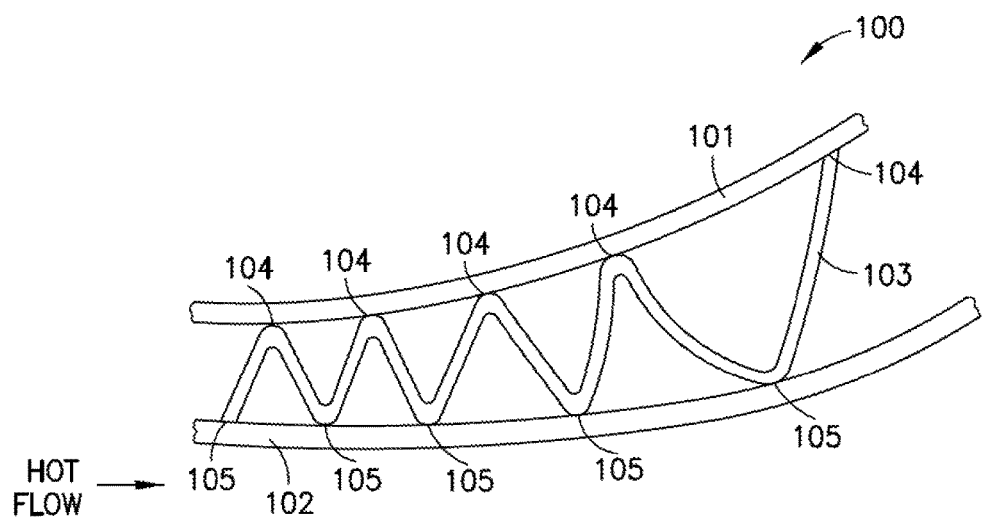
Figure 2:
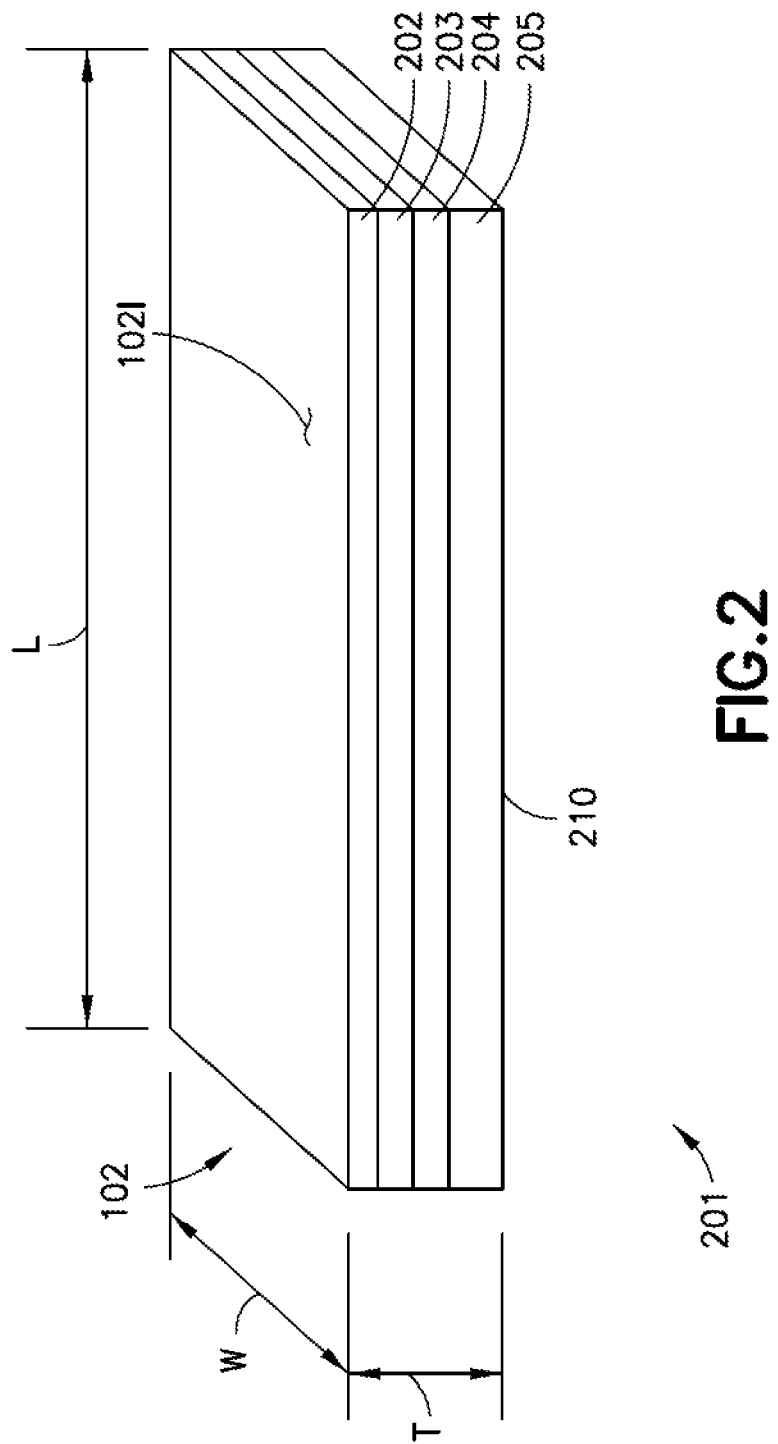
Figure 3A:
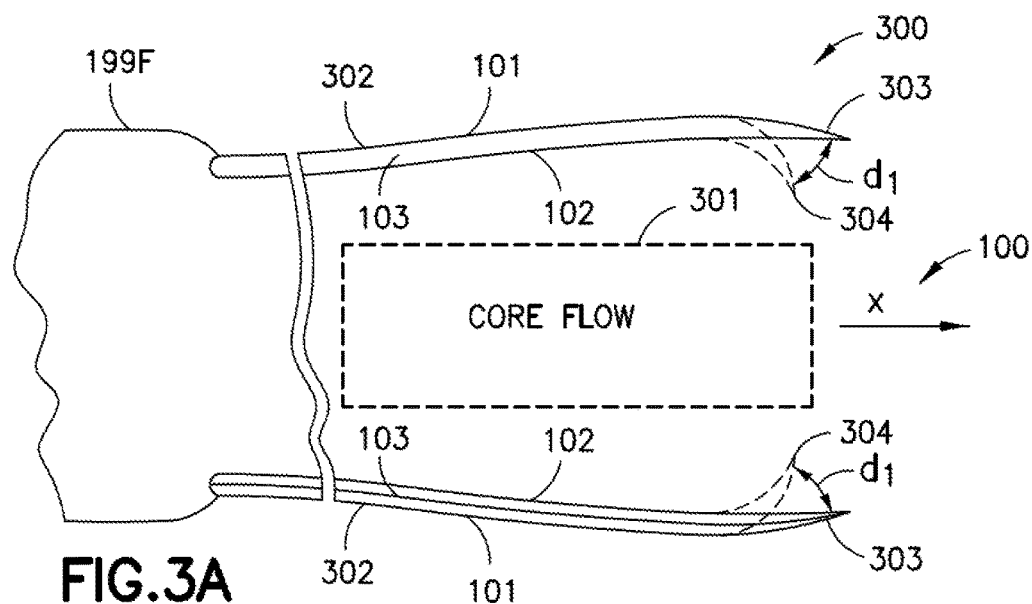
Figure 3B:
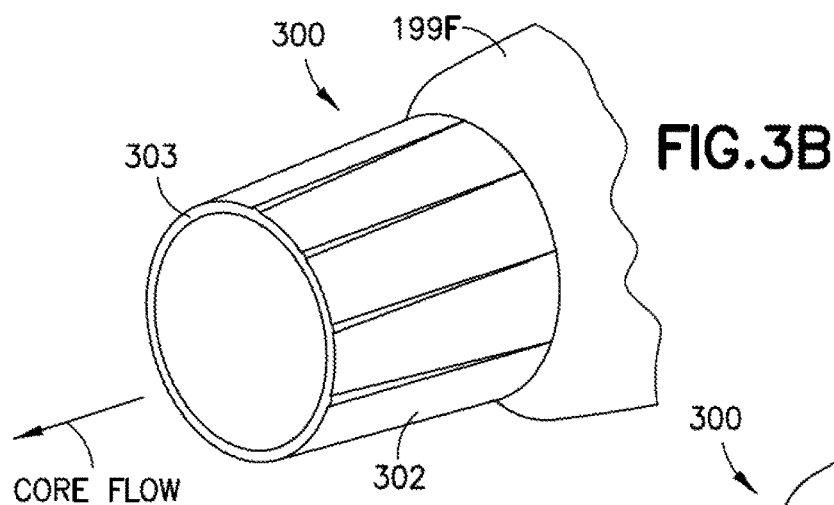
Figure 3C:
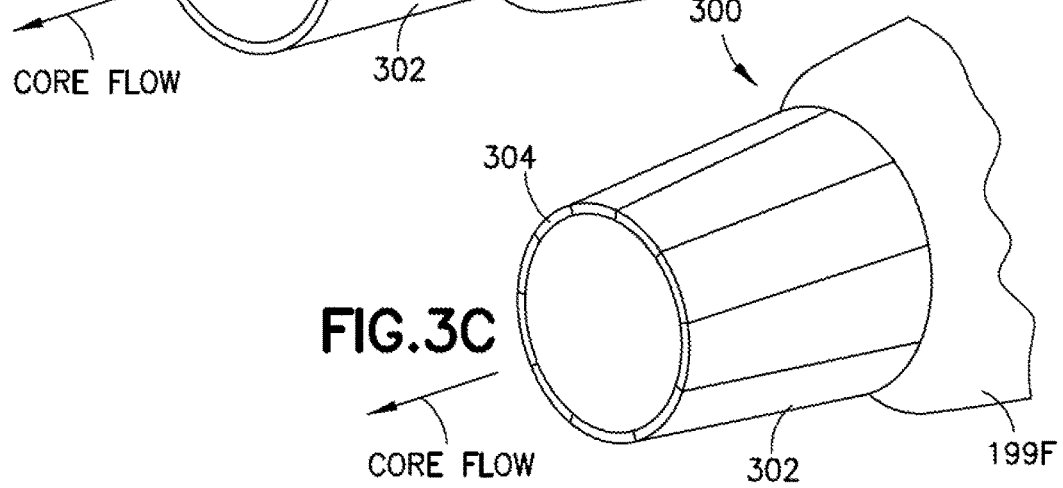
Figure 4:
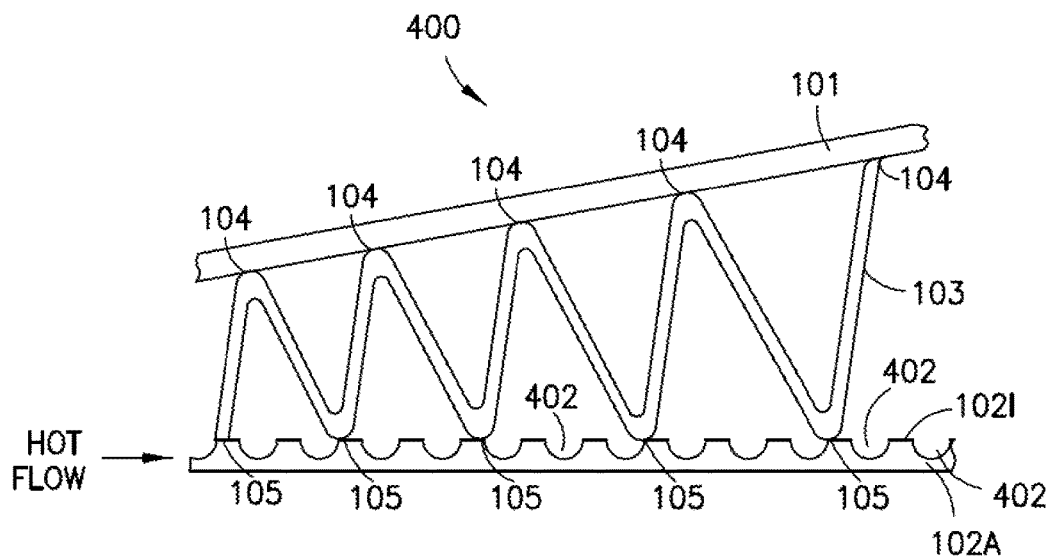
Figure 5:
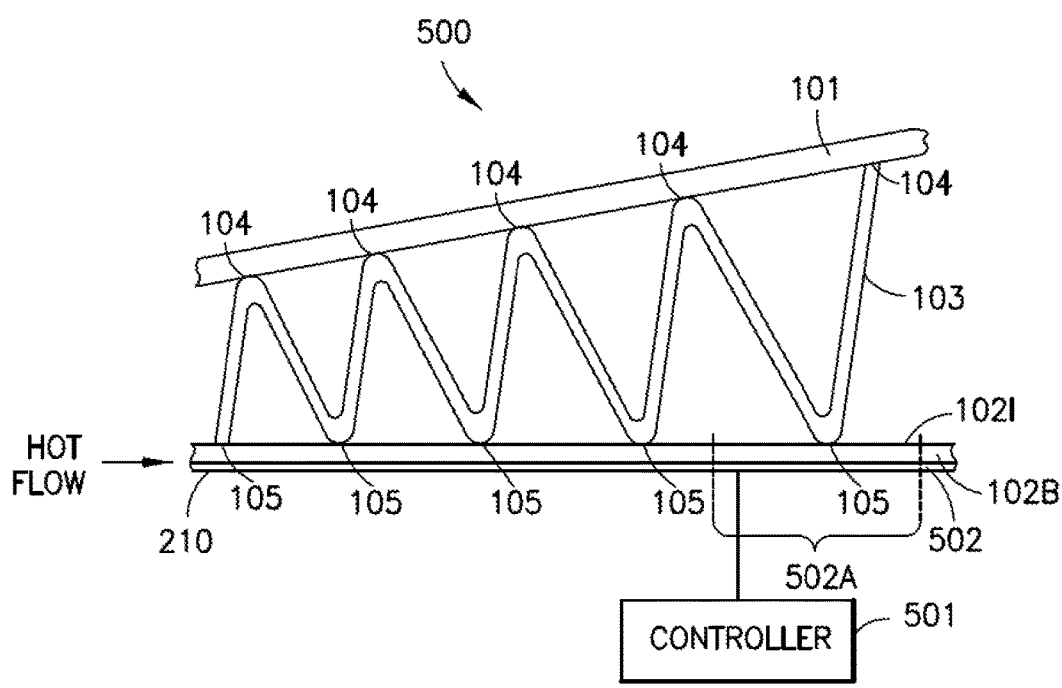
Figure 6A:
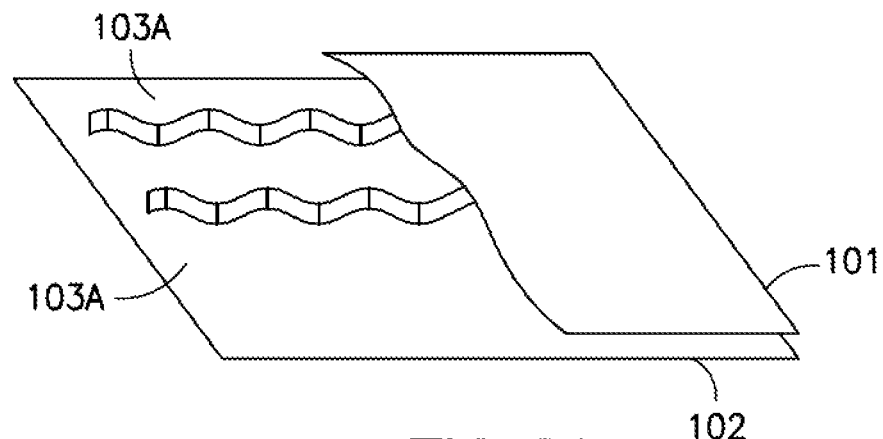
Figure 6B:
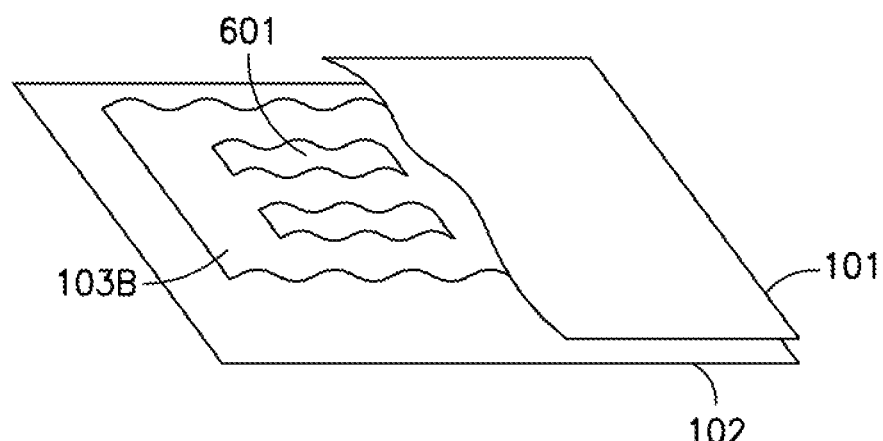
Figure 6C:
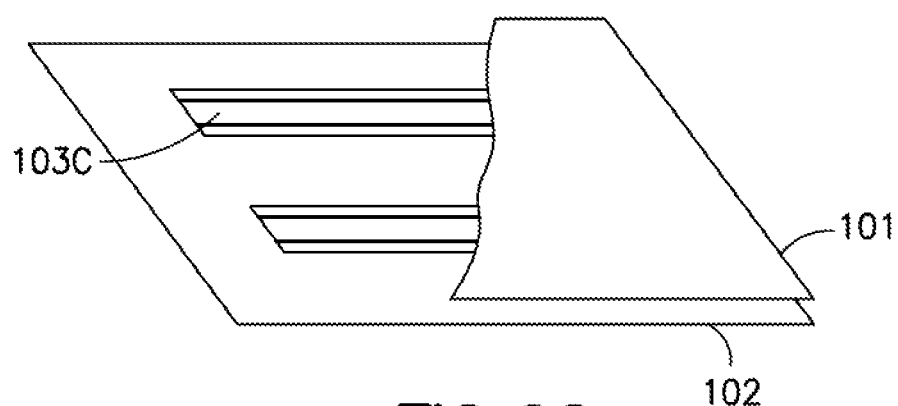
Figure 7A:
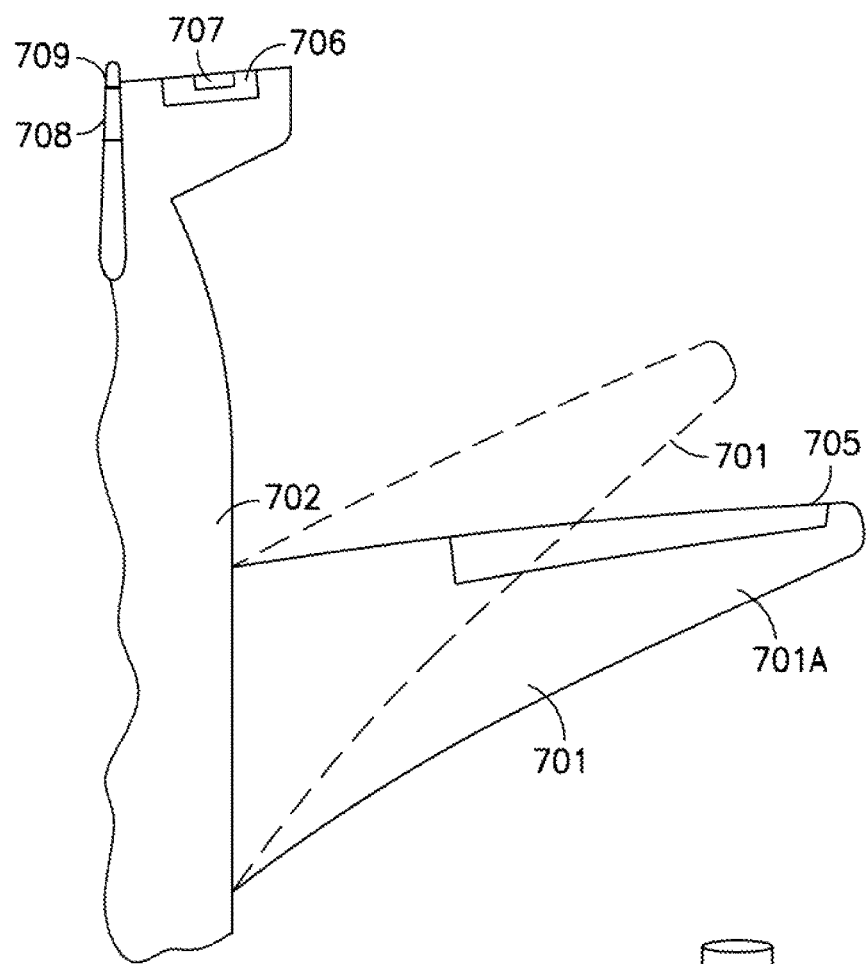
Figure 7B:
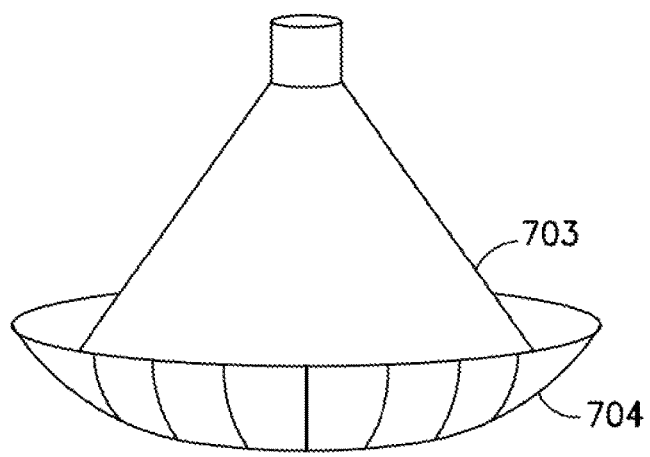
Figure 8:
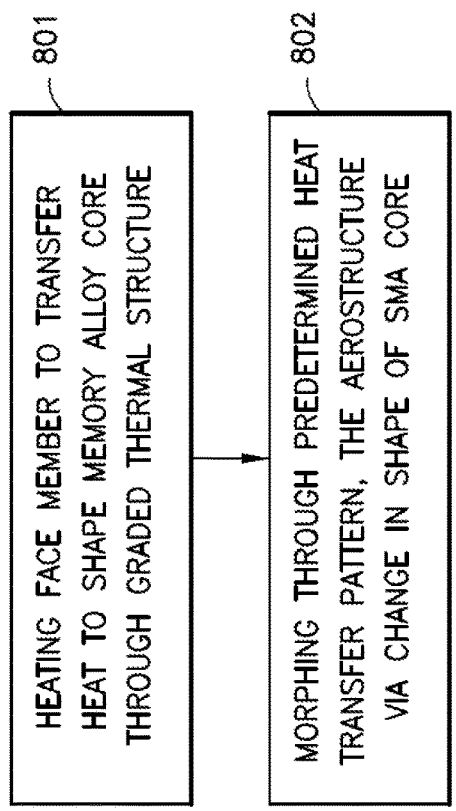
Figure 9:
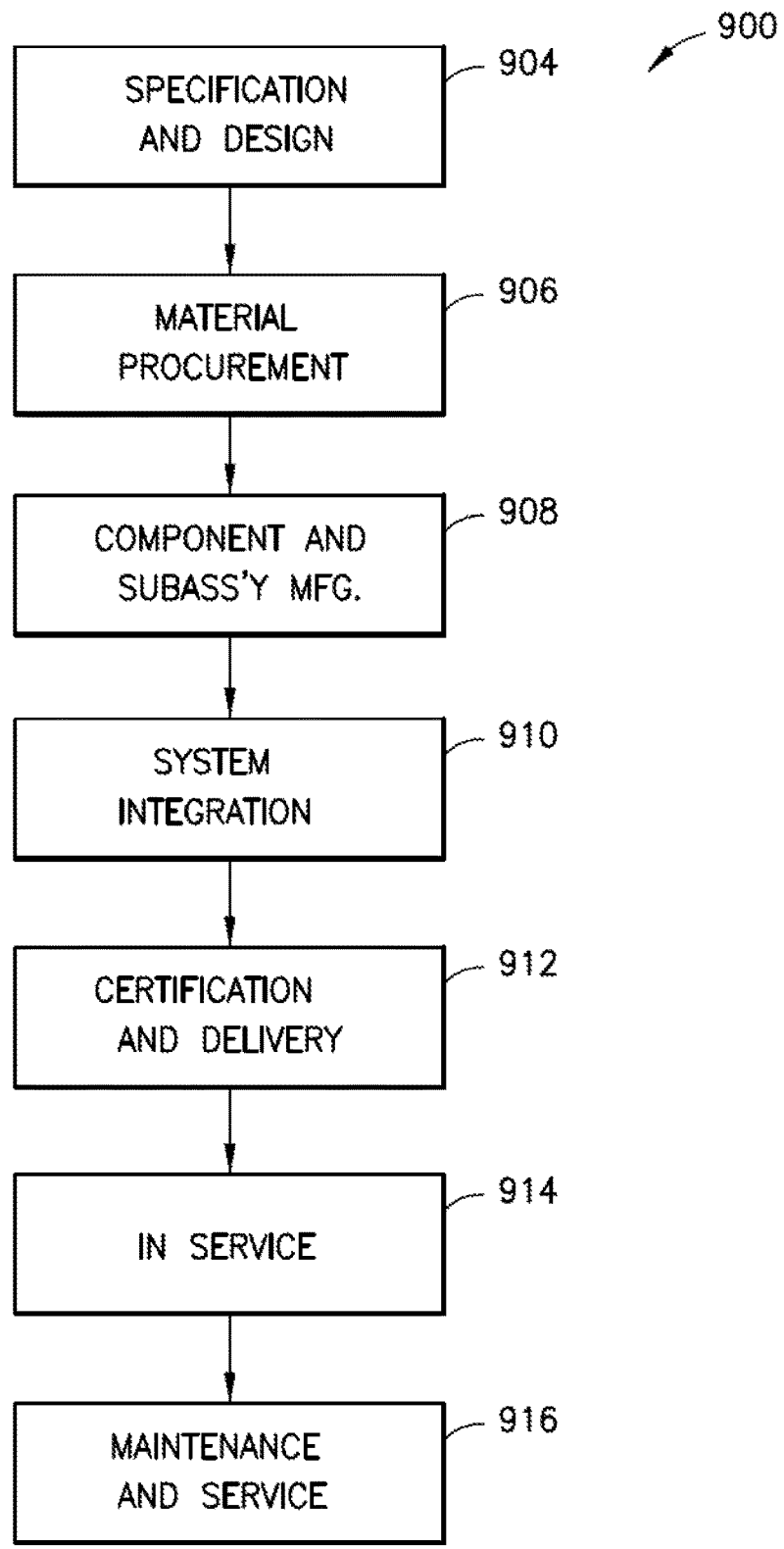
Figure 10:
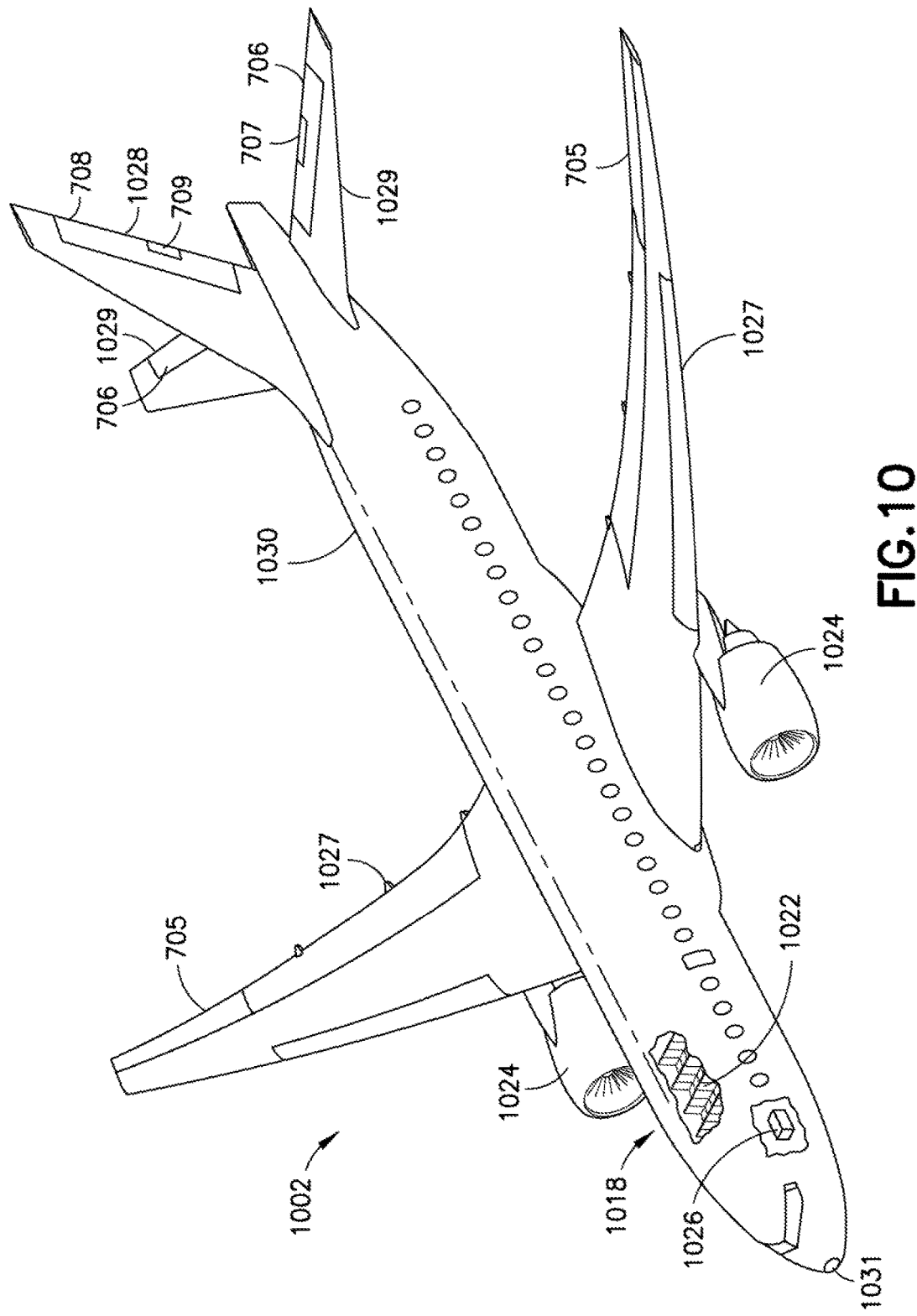
Figure 11:
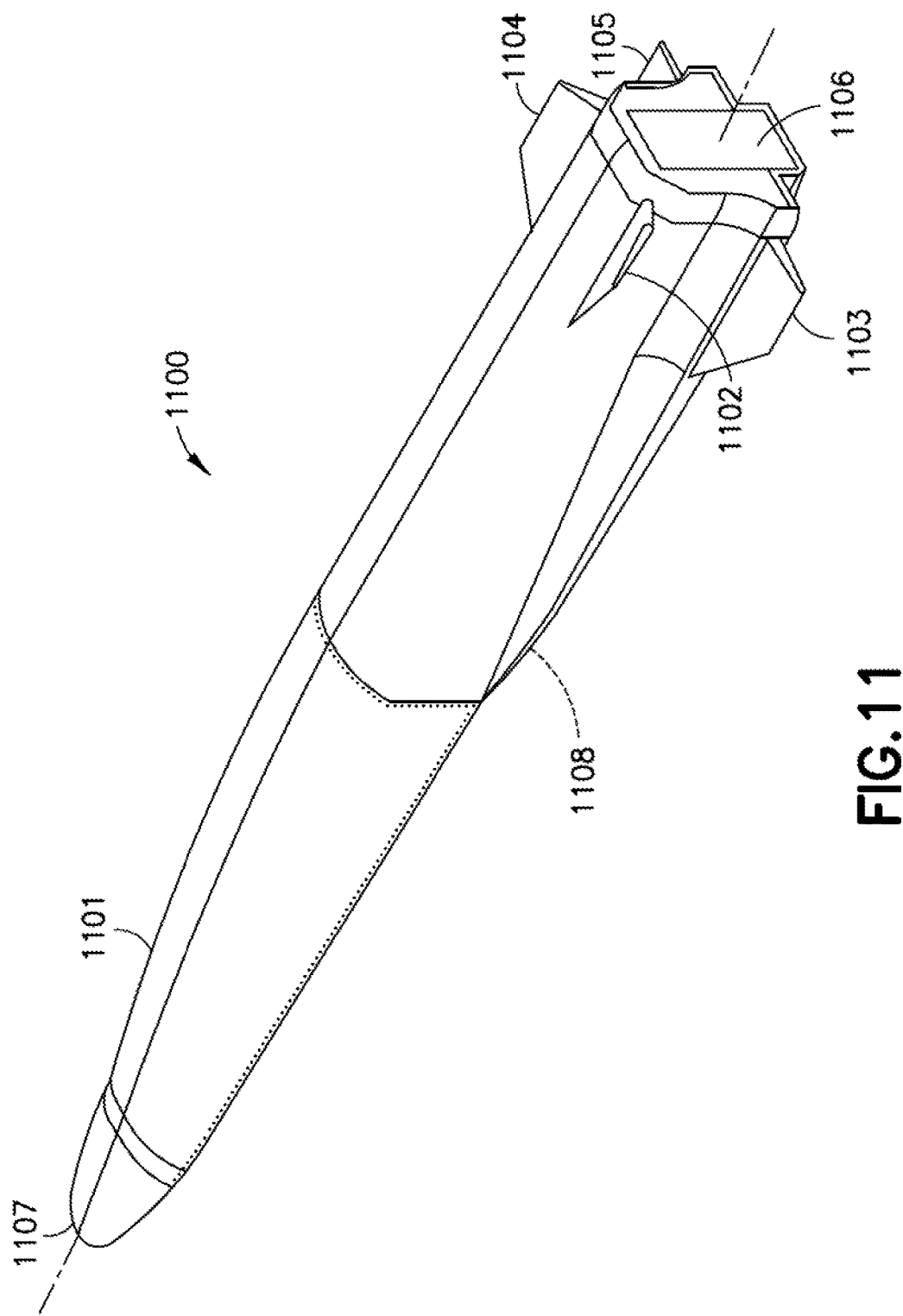

Having thus described examples of the disclosure in general terms, reference will now be made to the accompanying drawings, which are not necessarily drawn to scale, and wherein like reference characters designate the same or similar parts throughout the several views, and wherein:

FIG. 1 is a schematic illustration of an actuable multifunctional cellular structure according to aspects of the present disclosure;

FIGS. 1A-1B are exemplary illustrations of an actuable multifunctional cellular structure according to aspects of the present disclosure;

FIG. 2 is an exemplary cross-sectional illustration of a thermally graded structure according to aspects of the present disclosure;

FIG. 3A is an exemplary cross-sectional illustration of an actuable multifunctional cellular structure disposed within an engine exhaust nozzle of an aerospace vehicle according to aspects of the present disclosure;

FIGS. 3B-3C are exemplary perspective illustrations of an engine exhaust nozzle of an aerospace vehicle according to aspects of the present disclosure;

FIG. 4 is an exemplary illustration of an actuable multifunctional cellular structure according to one aspect of the present disclosure;

FIG. 5 is an exemplary illustration of an actuable multifunctional cellular structure according to one aspect of the present disclosure;

FIGS. 6A-6C are exemplary illustrations of an actuable multifunctional cellular structure according to one or more aspects of the present disclosure;

FIG. 7A-7B are exemplary illustrations of aerospace vehicles in accordance with one or more aspects of the present disclosure;

FIG. 8 is an exemplary method flow chart according to one or more aspects of the present disclosure;

FIG. 9 is a flow diagram of aircraft production and service methodology in accordance with one or more aspects of the present disclosure;

FIG. 10 is a schematic illustration of an aircraft in accordance with one or more aspects of the present disclosure; and FIG. 11 is a schematic illustration of a hypersonic aircraft in accordance with one or more aspects of the present disclosure.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings or connections other than those depicted in the block diagrams may also exist. Dashed lines, if any, connecting the various elements and/or components represent couplings or connections similar in function and purpose to those represented by solid lines; however, couplings or connections represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting. It is further noted that all numbers, temperatures, etc. are "about" and provided for exemplary purposes only. All specific numbers, temperatures and any other specific information may be more or less or any suitable number or temperature.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Referring now to FIGS. 1A-1B, an actuable multifunctional cellular structure 100 (also referred to as the actuable structure 100 for the purpose of simplicity) according to one aspect of the present disclosure is shown. In one aspect, the actuable structure 100 refers to the same structure in two different states of actuation. In one aspect, the actuable structure 100 is depicted in an unactuated state in FIG. 1A and actuable structure 100 is depicted in an actuated state in FIG. 1B. In one aspect, the actuable structure 100 includes a first and second face member 101, 102. In one aspect one of the first or second face member 101, 102 is a graded thermal structure (also known as a graded thermal face member). For exemplary purposes only the second face member 102 will be referred to herein as graded thermal structure 102 but it should be understood that in other aspects the first face member 101 is a graded thermal structure. The first face member 101 and the graded thermal structure 102 are joined by a shape memory alloy core 103. The shape memory alloy core 103 joins to face member 101 and the graded thermal structure 102 at attachment points 104 and 105, respectively. In one aspect, the shape memory alloy core 103 is actuatable under a predetermined condition and effects the actuation (e.g. a change in shape, morphing or deformation) of one or more of the face member 101 and the graded thermal structure 102. In one aspect, as will be described herein, the graded thermal structure 102 and/or the shape memory alloy core 103 are engineered to produce desired internal temperatures to drive or otherwise actuate the shape memory alloy core 103 to produce a desired structural shape change of one or more of the first face member 101 and the graded thermal structure 102 depending on, for example, the surface temperature of the graded thermal structure 102 at an interface 102I between the graded thermal structure 102 and the shape memory alloy core 103. The structure and composition of the actuable structures 100 and 100 are described in greater detail below.

As shown in FIG. 1, in one aspect of the present disclosure, the face member 101 is a deformable face member which is deformable to fit a contour of an aerospace vehicle, such as aerospace vehicle 199. In other aspects the face member is rigid (e.g. non-deformable) and formed, during manufacture, to conform with a contour of aerospace vehicle 199. In one aspect, the face member 101 is made from aluminum or other aerospace material. In other aspects, the face member 101 is made from titanium or any other material. In one aspect, the face member 101 is coupled or attached to an aerospace vehicle structure and/or airframe 199F so as to be immovable relative to the structure and/or airframe and forming an inner skin surface of the aerospace vehicle 199. In other aspects, the face member 101, and the actuable structure 100, is coupled to the aerospace vehicle structure and/or airframe so as to be cantilevered from the aerospace vehicle structure and/or airframe 199F such as when employed as an exhaust nozzle, engine inlet and/or wing structure/control surface of the aerospace vehicle 199. In one aspect, as will be described herein, the face member 101 is in fluid communication with a cold flow (e.g. faces a cold flow of external air over the surface of the actuable structure 100), an interior of the aerospace vehicle 199 or an area of fluid flow over the aerospace vehicle 199 subject to a lower temperature fluid flow so that the face member 101 where the face member 101 is constructed of a material having different properties than the graded thermal structure 102. In other aspects the face member 101 may be constructed of a material the same as or similar to at least a portion of the graded thermal structure 102.

Returning to FIGS. 1A-1B, in one aspect, the graded thermal structure 102 is composed of a graded thermal composite material, which is a form of a hybrid composite material. Graded thermal structures combine multiple materials and structures in a "stacked" arrangement. The graded thermal structure gradually transitions from materials suitable for interacting with a very hot environment and to less expensive and/or lighter materials. For example, referring also to FIG. 2, an example of a cross section 201 of a graded thermal structure 102 is shown. Though four graded layers 202-205 are depicted in FIG. 2, in other aspects the graded thermal structure includes more or less than four graded layers. In one aspect, the compositional gradient between graded layers 202-205 includes non-abrupt transition (depicted as a gradient in shading of the graded layers 202-205) between two or more components of the graded thermal structure. The graded layers 202-205 form a gradient of materials across the cross section 201. In one aspect of the present disclosure, components with the graded layers 202-205 are produced using build-up (additive) fabrication processes and typical material deposition techniques can be employed to create a composite/hybrid billet or near net shape with graded layers. Laser assisted near net shape manufacturing, laser sintering, field assisted sintering (aka spark plasma sintering or pulsed electric current sintering), spray forming or thermal spray forming can be employed to produce a graded layered composite near net shape preform. Hot isostatic pressing or other consolidation processes can subsequently be employed for densification and property enhancement and to produce an intermediate near net shape. Heat treatment can be employed for creating a final near net shape graded composite. While the drawing shows distinct graded layers for simplicity, a final built-up graded layered composite near net shape may have blended properties creating a smooth transition from layer to layer. However, in other aspects, the graded layers are produced by any process including, for example, typical powder metallurgy techniques, in which a graded layered composite near net shape preform is built with a graded base elemental powder chemistry corresponding to the desired gradation and other additives typically used in powder metallurgy processing and compacted. Typical consolidation processing is then employed to create a graded layered composite near net shape. In one aspect, the graded layers 202-205 form the compositional gradient which can be tailored or tuned to form a predetermined pattern of thermal transfer across the cross section thickness T from for example, a fluid flow interface surface 210 to interface 102I, forming a predetermined thermal gradient across a length L and/or width W of the graded thermal structure 102. In one aspect, the graded layer 205 is substantially composed of a ceramic material and the graded layer 202 is substantially composed of a metal (for example, titanium or other suitable metals). The layers 203-204 form non-abrupt transitional layers composed of varying amounts of ceramic and metal. In other aspects, the graded layers 202-205 can have any suitable material composition.

Graded thermal composite materials are characterized by a compositional gradient from one component material to another (e.g. non-abrupt transitions between one layer of component material to another). The compositional gradient that characterizes graded thermal composite materials provides for the graded thermal structure 102 to have predetermined thermal properties beyond isothermal properties and having predetermined thermal responses. For example, in one aspect, the graded thermal structure 102 has a compositional gradient which transitions from materials which can withstand extreme temperatures (for example, ceramic) to metals. In one aspect, the graded thermal structure 102 has a composition which can be tailored or tuned to a shape of the actuable structure 100. For example, the graded thermal structure 102 is tunable to change a gradient profile over a length L and or width W of the actuable structure 100 that is variable over time. In one aspect, the thermal gradient through the graded thermal structure 102 complements the structure gradient (e.g. the gradient of materials 202-205) while in other aspects, the structure gradient complements the thermal gradient. The complimentary thermal and structure gradients allow both fine control and more control authority to effect a shape change of the actuable structure 100. For example, in one aspect, the graded thermal structure 102 has thermal properties where extreme temperatures on one side (e.g. the fluid flow interface surface 210) are dissipated by or partially transferred through the structure gradient to the other side (e.g. interface 102I) of the structure in a predetermined pattern. In one aspect, a temperature gradient is generated along the length L and/or width W of the graded thermal structure 102, varying the heat transferred along a length L and/or width W of the graded thermal structure 102 to the shape memory allow core 103. In one aspect, the temperature gradient is substantially tunable or configurable based on the compositional gradient of the graded thermal structure 102. As noted above, the temperature gradient generated along the graded thermal structure 102 effects a predetermined pattern of thermal transfer between one surface of the graded thermal structure 102 (e.g. the fluid flow interface surface 210) and the other surface (e.g. interface 102I) of the graded thermal structure. This predetermined pattern of thermal transfer provides for the graded thermal structure 102 to withstand extreme temperatures along the fluid flow interface surface 210 of the graded thermal structure 102 in fluid communication with a hot flow, and to thermally transfer a substantially lower temperature pattern to the shape memory alloy core 130 at the interface surface 102I of the graded thermal structure 102. In one aspect, the graded thermal structure 102 effects heat transfer from the hot flow to the shape memory alloy core 103, which causes a predetermined change in the shape of the shape memory alloy core 103 and effects a change in shape of the actuable structure 100. In one aspect, the graded thermal structures can be tailored for individual applications with varying materials and layup. In one aspect, the graded thermal structure 102 is in fluid communication with a hot flow (for example, a hot flow of exhaust gases, a hot flow of air across an aerospace vehicle surface during re-entry or passive ambient temperature). In one aspect, the hot flow passively heats the surface of the graded thermal structure 102. However, in other aspects, the graded thermal structure 102 is actively controlled with a thermal control element (described in greater detail below).

Referring still to FIGS. 1A-1B, the face member 101 and the graded thermal structure 102 are coupled to the shape memory alloy core 103 at attachment points 104 and 105, respectively. In one aspect, the attachment points 104 and 105 join the shape memory alloy core 103 to the face member 101 and the graded thermal structure 102 with rivets or other mechanical attachment. However, in other aspects, the attachment points 104 and 105 join the shape memory alloy core 103 to the face member 101 and graded thermal structure 102 with welded or soldered attachment points. Shape memory alloys (otherwise known as SMA, smart metal, memory metal and memory alloy) are a classification of materials that changes shape, position, stiffness and a number of mechanical properties in response to certain predetermined conditions. In one aspect, the predetermined condition is a change in temperature, but in other aspects, the predetermined condition also includes, for example, pressure or electromagnetic fields. In one aspect, shape memory alloys are tailored to provide certain high pressure displacement at certain positions by "training" the shape memory alloy structure to behave in a controlled manner between the phase transition from martensite to austenite states (and back again) without compromising certain material properties. In one or more aspects, the shape memory alloy core 103 is employed as a solid-state substitute for mechanical or hydraulic actuators, by exerting high pressure displacement during deflection as it transitions between martensite and austenite states. In one aspect, the high pressure displacement is great enough to resist exhaust thrust from an aerospace vehicle engine and/or fluid flow over a control surface of the aerospace vehicle. When properly tailored, the shape memory alloy core 103 may exert high pressure displacement during the deflection as it transitions between martensite and austenite states and may deflect faster than conventional (e.g. mechanical or hydraulic) actuators.

Shape memory alloys making up the shape memory alloy core 103 include, for example, nickel-titanium alloys that exhibit reversible solid state phase transformation under prescribed conditions. During the phase transition, the alloy may undergo pronounced and reversible change in shape at the structural level, producing reversible characteristics and performance appropriate for control surfaces, intakes and/or exhausts of the aerospace vehicle 199. In other aspects of the present disclosure, any suitable shape memory alloy or material may be configured to function as the shape memory alloy core 103, including, but not limited to, shape memory alloys of zinc, copper, gold and iron, having phase transitions that occur over any suitable range of temperatures. In one aspect, the shape memory alloy core 103 is actuable under a predetermined condition and effects a deformation (e.g. morphing) of one or more of the face member 101 and graded thermal structure 102 along, for example, a contour of the aerospace vehicle 199. In one aspect, the shape memory alloy core 103 of the actuable structure 100 (depicting an unactuated structure in FIG. 1A) experiences a change in temperature resulting from heat transferred from the hot flow through the graded thermal structure 120 in a predetermined pattern of thermal transfer. The change in temperature experienced by the shape memory alloy core 103 effects a deformation and actuation (e.g. changing the morphology of the shape memory alloy core 103 when exposed to naturally generated heat sources such as exhaust) of the shape memory alloy core 103, resulting in high pressure displacement transferred to one or more of the face member 101 and the graded thermal structure 102 via the respective attachment points 104 and 105. The high pressure displacement generated by the shape memory alloy core 103 causes the actuable structure 100 to deform and change the surface contours of a portion of the aerospace vehicle 199 formed by the actuable structure 100, as shown in FIG. 1B, which depicts the actuable structure 100 in an actuated state. In one aspect of the disclose embodiment, the shape memory alloy core 103 is also a graded thermal structure where the material gradient and heat transfer properties are tunable in a manner similar to the graded thermal structure 102 so that actuation of the shape memory core 103 varies along a length and/or width of the shape memory alloy core 103. In one aspect, the shape memory core 103 has a cellular configuration having a substantially sinusoidal shape. However, in other aspects, the shape memory core 103 has a cellular configuration in any suitable shape, such as, for example, prismatic cellular configurations.

Referring now to FIGS. 3A-3C, the actuable structure 100 is shown as being incorporated into the engine exhaust nozzle 300 of an aerospace vehicle. FIG. 3A illustrates a simplified cross-sectional view of the engine exhaust nozzle 300 and an engine cowl 302 which are coupled to the airframe 199F. The engine exhaust nozzle 300 is depicted in an unactuated position 303 in solid lines. In one aspect, the at least a portion of the engine exhaust nozzle 300 is comprised of the actuable structure 100, substantially similar to those shown in FIGS. 1A-1B. In one aspect, a plurality of the actuable structures 100 are connected or are integrally formed and are utilized to form a larger actuable structure (for example, an engine nozzle). For example, the interior surface of the engine exhaust nozzle 300 corresponds to the fluid flow interface surface 210 of the graded thermal structure 102 and the exterior surface of the engine nozzle is the face member 101. In one aspect, the engine exhaust nozzle 300 expels a core flow 301 (e.g. a hot flow, or engine exhaust) from the engine exhaust nozzle 300 in direction X where the core flow interfaces with the fluid flow interface surface 210 of the graded thermal structure 120. Heat from the core flow 301 is transferred to the shape memory allow 103 in a predetermined pattern of thermal transfer through the graded thermal structure 102. The heat transferred through the graded thermal structure 102 effects a predetermined change in the shape of the shape memory alloy core 103 and effects a change in the shape of the engine exhaust nozzle 300. The change in shape of the engine exhaust nozzle 300 results in the engine exhaust nozzle 300 morphing to the actuated position 304 (shown in phantom) of the engine exhaust nozzle 300, which results in deflection or displacement dl of the engine exhaust nozzle 300, such as during operation of an afterburner. Referring now to FIGS. 3B and 3C, perspective views of the change in shape of the engine exhaust nozzle 300 is shown where the nozzle outlet area is decreased during actuation of the actuable structure 100 forming the engine exhaust nozzle 300.

Referring now to FIG. 4, an actuable structure 400 is illustrated. The actuable structure 400 is substantially similar to the actuable structure 100 as shown in FIGS. 1-1B. In one aspect, the actuable structure 400 provides for passive cooling systems through the actuable structure 400 so that the heat transferred to the shape memory allow core 103 is further tailored in a predetermined thermal transfer pattern. In one aspect, the graded thermal structure 102A (which is substantially similar to the graded thermal structure 102 of FIGS. 1-1B) has a number of layers (see layers 202-205 in FIG. 2), where the layers form one or more fluid passages 410 through the graded thermal structure 102A. In other aspects, one or more fluid passages 410 are formed in the face member 101. In one aspect, the fluid passage(s) 410 includes one or more vents and/or channels 402 formed along a surface, such as interface surface 102I of the graded thermal structure 102A and/or formed between/within the layers 202-205 of the graded thermal structure 102A. In one aspect, the vents and/or channels 402 provide for passive cooling of the graded thermal structure 402 such as by directing a cooling fluid from any suitable source (e.g. fluid flowing over the aerospace vehicle or from a cooling system). In one aspect, the vents and/or channels 402 are depicted as being formed on or in the graded thermal structure 102A, however in other aspects, the vents and/or channels 402 are formed in the face member 101 or both the face member 101 and graded thermal structure 102A as noted above. In one aspect, the passive cooling provided by the vents and/or channels 402 further provides for further tunability and customization of the actuable structure 400 and how the actuable structure 400 deforms when actuated.

Referring now to FIG. 5, an actuable structure 500 is shown. The actuable structure 500 is substantially similar to the actuable structure 100 as shown in FIGS. 1-1B. In one aspect, the actuable structure 500 provides for active heating or cooling of the actuable structure 500. The graded thermal structure 102B (which is substantially similar to the graded thermal structure 102) has one or more thermal control element(s) 502 (also referred to as an active thermal element) coupled or attached to a surface of the graded thermal structure 102B. In one aspect, the thermal control element(s) 502 are coupled to one or more of the fluid flow interface surface 210 and the interface 102I. In other aspects, the thermal control element 502 is coupled or attached to the face member 101. In one aspect, the thermal control element(s) 502 is a heating element. However, in other aspects, the thermal control element 502 is a cooling element (for example a peltier device or watercooling blocks). In one aspect, the thermal control element(s) 502 is communicatively coupled to, and controlled by, a controller 501. The controller 501, in one aspect, is a microcontroller, but in other aspects, can be any suitable control mechanism such as any suitable control system of the aerospace vehicle 199 (FIG. 1). In one aspect, the controller 501 can selectively control the thermal control element 502 to effect a temperature change through the graded thermal structure 102B to the shape memory alloy core 103, effecting a predetermined change in shape of the shape memory alloy core 103 and thus the actuable structure 500. In one aspect, the controller 501 can selectively activate portions of the thermal control element 502A, providing a greater degree of granular control over the actuation/morphing of the actuable structure 500.

Referring now to FIGS. 6A-6C, shape memory alloy cores 103A-103C are shown in different configurations according to one or more aspects of the present disclosure. The configuration of each shape memory alloy core 103 is different to tailor or tune the displacement and/or actuation of the shape memory alloy core 103 for different purposes. In FIG. 6A, a shape memory alloy core 103A is depicted having a substantially sinusoidal configuration. The shape memory alloy core 103A attaches to the face member 101 and the graded thermal structure 102 at the maxima and minima of the sinuses and effect high pressure displacement, through a predetermined change in shape of the shape memory alloy core 103, to one or more of the face member 101 and the graded thermal structure 102. The high pressure displacement results in the deformation of one or more of the face member 101 and the graded thermal structure 102. In FIG. 6B, a shape memory alloy core 103B is depicted in the form of substantially sinusoidal sheets of shape memory alloy with apertures 601 disposed through the sheets. The shape memory alloy core 103B behaves substantially similar to the shape memory alloy core 103A, but the apertures 601 allow for the decrease in weight and material needed, and can provide for further tailoring or tuning of the actuation of the shape memory alloy core 103B. In FIG. 6C, a shape memory alloy core 103C is depicted in a substantially beam-structure. In one aspect, the shape memory alloy cores 103C have different shape memory alloys across the length and/or width of the shape memory alloy core 103C, which further tailors or tunes the actuation and displacement of the shape memory alloy core 103C such as where the different shape memory alloys react differently (e.g. more or less displacement) to a common temperature or to a temperature gradient provided through the graded thermal structure 102.

In other aspects, any suitable configuration of shape memory alloy cores are possible, including (but not limited to), spherical shape memory alloy cores, rod shape memory alloy cores and/or solid sheets of shape memory alloy cores.

Referring now to FIG. 7A-7B, in accordance with aspects of the present disclosure any suitable part of the aerospace vehicle 199 (FIG. 1) is morphable. For example, a portion of a jet 702 or other aircraft is shown in FIG. 7A. In one aspect, the jet 702 has a morphable wing 701. The morphable wing 701A can be morphed between an extended position 701A and a swept wing position 702B in response to different conditions during flight, for example, passive changes in ambient temperature, pressure, etc. In other aspects, the morphable wing 701 can be morphed to any suitable configuration according to flight conditions such as to change an amount of lift generated by the shape of the morphable wing 701. In some aspects of the present disclosure, the actuable structures described herein form a control surface of an aerospace vehicle. For example, in one aspect, the actuable structures are used to actuate and be integral to aerospace vehicle control surfaces such as the ailerons 705, elevators 706, elevator trim tabs 707, rudders 708 and rudder trim tabs 709, where active heating and/or passive elements are used to actuate the aerospace vehicle control surfaces. In one aspect, a temperature change during flight, such as caused by frictional effects on the control surfaces, effect a change in shape of the control surfaces such as for a transition between one or more of subsonic flight, supersonic flight and hypersonic flight. In other aspects, the actuable structure also forms one or more of an engine inlet or an engine outlet/exhaust where a temperature of the exhaust changes a shape of the engine inlet and/or outlet to, for example, reduce noise and/or direct or increase thrust. In yet other aspects, aerospace vehicle control surfaces include, for example, control surfaces 704 (e.g. an airbrake) of an aerospace capsule 703, which is, in one aspect, passively actuated by heat generated by the re-entry of the aerospace capsule 703.

Referring now to FIG. 8, an exemplary flowchart for actuation process of the actuable structure is shown. At block 801, a face member, such as the graded thermal structure 102 is heated to transfer heat to a shape memory alloy core 103 where the heat is transferred through a graded thermal structure in a predetermined heat transfer pattern. At block 802, the aerostructure is morphed, through the predetermined heat transfer pattern, via a change in a shape of the shape memory alloy core 103.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 900 as shown in FIG. 9, an aircraft 1002 as shown in FIG. 10 (while a subsonic aircraft is illustrated, the aspects of the present disclosure also apply to supersonic aircraft) and a hypersonic aircraft 1100 as shown in FIG. 11. In one aspect, the actuable structures described herein can be employed, for instance, in any stage of aircraft manufacturing and the actuable structures may form any suitable part of an aircraft or component used in aircraft design and manufacture. During pre-production, illustrative method 900 may include specification and design 904 of the aircraft 1002 and material procurement 906. During production, component and subassembly manufacturing 908 and system integration 910 of the aircraft 1002 take place. The actuable structures described herein may be employed as part of the component and subassembly manufacturing process 908. Thereafter, the aircraft 1002 may go through certification and delivery 912 to be placed in service 914. While in service by a customer, the aircraft 1002 is scheduled for routine maintenance and service 916 (which may also include modification, reconfiguration, refurbishment, and so on).

Each of the processes of the illustrative method 900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, the aircraft 1002 produced by the illustrative method 900 may include an airframe 1018 with a plurality of high-level systems and an interior 1022. Examples of high-level systems include one or more of a propulsion system 1024, an electrical system 1026, a hydraulic system 1028, and an environmental system 1030. Examples of systems which may include actuable structures may include propulsion system 1024, the wings 1027 (for example, the airelon 705), the horizontal stabilizers 1029 (for example, on the elevator 706 and elevator trim tab 707), and vertical stabilizers 1028 (e.g. the rudder 708 and rudder trim tab 709). Although an aerospace example is shown, the principles of the invention may be applied to other industries, such as the automotive and maritime industries.

As shown in FIG. 11, a hypersonic aircraft 1100 produced by the illustrative method 900 includes an airframe 1101. In accordance with one or more aspects of the present disclosure, any of the leading edges and control surfaces of the hypersonic aircraft 1100 may include actuable structures, such as, for example, the airframe 1101, the nose cone 1107, the aerodynamic control fins 1102-1105 as well as the engine outlet 1106 and the engine inlet 1108.

Apparatus and methods shown or described herein may be employed during any one or more of the stages of the manufacturing and service method 900. For example, components or subassemblies corresponding to component and subassembly manufacturing 908 may be fabricated or manufactured in a manner similar to components or subassemblies produced while the aircraft 1002 or hypersonic aircraft 1100 is in service. Also, one or more aspects of the apparatus, method, or combination thereof may be utilized during the production states 908 and 910, for example, by substantially expediting assembly of or reducing the cost of an aircraft 1002 or hypersonic aircraft 1100. Similarly, one or more aspects of the apparatus or method realizations, or a combination thereof, may be utilized, for example and without limitation, while the aircraft 1002 or hypersonic aircraft 1100 is in service, e.g., maintenance and service 916.

In accordance with one or more aspects of the present disclosure, an aerospace vehicle includes a frame, an actuable multifunctional cellular structure connected to the frame, the actuable multifunctional cellular structure including a first face member and a second face member, and a shape memory alloy core coupled to the first face member and the second face member, and wherein, at least one of the first face member and the second face member is a graded thermal structure configured so that heat transferred through the graded thermal structure in a predetermined thermal pattern to the shape memory alloy core effects a predetermined change in a shape of the shape memory alloy core and effects a change in shape of the actuable multifunctional cellular structure.

In accordance with one or more aspects of the present disclosure, the graded thermal structure is configured to vary heat transferred along a length or width of the graded thermal structure.

In accordance with one or more aspects of the present disclosure, the shape memory alloy core is a graded thermal structure.

In accordance with one or more aspects of the present disclosure, at least one of the first and the second face members is layered, where the layers form a fluid passage through the at least one of the first and the second face members.

In accordance with one or more aspects of the present disclosure, the fluid passage is a cooling fluid passage.

In accordance with one or more aspects of the present disclosure, at least one of the first and the second face members include an active thermal element.

In accordance with one or more aspects of the present disclosure, the active thermal element is a heating element.

In accordance with one or more aspects of the present disclosure, the active thermal element is a cooling element.

In accordance with one or more aspects of the present disclosure, the aerospace vehicle further comprising a controller configured to effect a temperature change in the graded thermal structure with the at least one active thermal element.

In accordance with one or more aspects of the present disclosure, at least one of the first and the second face members include a passive thermal element.

In accordance with one or more aspects of the present disclosure, the actuable multifunctional cellular structure is a control surface of the aerospace vehicle.

In accordance with one or more aspects of the present disclosure, the actuable multifunctional cellular structure is one or more of an engine inlet and an engine outlet.

In accordance with one or more aspects of the present disclosure, an actuable multifunctional cellular structure includes a first and a second face member, a shape memory alloy core coupled to the first and second face member, and wherein, at least one of the first and second face members is a graded thermal structure with thermal characteristics that effect a predetermined change in a shape of the shape memory alloy core.

In accordance with one or more aspects of the present disclosure, the graded thermal structure is configured to vary heat transferred along a length or width of the graded thermal structure.

In accordance with one or more aspects of the present disclosure, the shape memory alloy core is a graded thermal structure.

In accordance with one or more aspects of the present disclosure, at least one of the first and the second face members is layered, where the layers form a fluid passage through the at least one of the first and the second face members.

In accordance with one or more aspects of the present disclosure, the fluid passage is a cooling fluid passage.

In accordance with one or more aspects of the present disclosure, at least one of the first and the second face members include an active thermal element.

In accordance with one or more aspects of the present disclosure, the active thermal element is a heating element.

In accordance with one or more aspects of the present disclosure, the active thermal element is a cooling element.

In accordance with one or more aspects of the present disclosure, the actuable multifunctional cellular structure further comprising a controller configured to effect a temperature change in the graded thermal structure with the at least one active thermal element.

In accordance with one or more aspects of the present disclosure, the actuable multifunctional cellular structure is a control surface of an aerospace vehicle.

In accordance with one or more aspects of the present disclosure, the actuable multifunctional cellular structure is one or more of an engine inlet and an engine outlet.

In accordance with one or more aspects of the present disclosure, a method for morphing a multifunctional cellular aerostructure including heating one or more of a first and a second face member to transfer heat to a shape memory alloy core through a graded thermal structure in a predetermined heat transfer pattern, and morphing, through the predetermined heat transfer pattern, the multifunctional cellular aerostructure where the predetermined heat transfer pattern effects a change in a shape of the shape memory alloy core and one of the first and second face members interfaces with a fluid flow over the multifunctional cellular aerostructure.

In accordance with one or more aspects of the present disclosure, the method further comprising varying, with the graded thermal structure, the heat transferred along a length or width of the first and the second face member.

In accordance with one or more aspects of the present disclosure, the method further comprising flowing fluid through at least one fluid passage within one or more of the first and the second face members.

In accordance with one or more aspects of the present disclosure, the method further comprising cooling the at least one of the first or the second face members with the fluid flowing through the fluid passage.

In accordance with one or more aspects of the present disclosure, the method further comprising transferring heat to the shame memory alloy core with an active or passive thermal element.

In accordance with one or more aspects of the present disclosure, the method further comprising effecting, with the active thermal element, a temperature change in one or more of the first and the second face members with a controller.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. An aerospace vehicle comprising:
   a frame;
   an actuable multifunctional cellular structure connected to the frame, the actuable multifunctional cellular structure including:
      a first face member and a second face member, and
      a shape memory alloy core coupled to the first face member and the second face member; and
      wherein, at least one of the first face member and the second face member is a graded thermal structure configured so that heat transferred through the graded thermal structure in a predetermined thermal pattern to the shape memory alloy core effects a predetermined change in a shape of the shape memory alloy core and effects a change in shape of the actuable multifunctional cellular structure.

2. The aerospace vehicle of claim 1, wherein the graded thermal structure is configured to vary heat transferred along a length or width of the graded thermal structure.

3. The aerospace vehicle of claim 1, wherein the shape memory alloy core is a graded thermal structure.

4. The aerospace vehicle of claim 1, wherein at least one of the first face member and the second face members is layered, where the layers form a fluid passage through the at least one of the first face member and the second face members.

5. The aerospace vehicle of claim 1, wherein at least one of the first face member and the second face members include an active thermal element.

6. The aerospace vehicle of claim 5, wherein the active thermal element is a heating element.

7. The aerospace vehicle of claim 5, wherein the active thermal element is a cooling element.

8. The aerospace vehicle of claim 5, further comprising a controller configured to effect a temperature change in the graded thermal structure with the at least one active thermal element.

9. The aerospace vehicle of claim 1, wherein at least one of the first face member and the second face members include a passive thermal element.

10. The aerospace vehicle of claim 1, wherein the actuable multifunctional cellular structure is a control surface of the aerospace vehicle.

11. An actuable multifunctional cellular structure comprising:
    a first and a second face member;
    a shape memory alloy core coupled to the first and second face member; and
    wherein, at least one of the first and second face members is a graded thermal structure with thermal characteristics that effect a predetermined change in a shape of the shape memory alloy core.

12. The actuable multifunctional cellular structure of claim 11, wherein the graded thermal structure is configured to vary heat transferred along a length or width of the graded thermal structure.

13. The actuable multifunctional cellular structure of claim 11, wherein the shape memory alloy core is a graded thermal structure.

14. The actuable multifunctional cellular structure of claim 11, wherein at least one of the first and the second face members is layered, where the layers form a fluid passage through the at least one of the first and the second face members.

15. The actuable multifunctional cellular structure of claim 11, wherein at least one of the first and the second face members include an active thermal element.

16. The actuable multifunctional cellular structure of claim 15, further comprising a controller configured to effect a temperature change in the graded thermal structure with the at least one active thermal element.

17. A method for morphing a multifunctional cellular aerostructure comprising:
   heating one or more of a first and a second face member to transfer heat to a shape memory alloy core through a graded thermal structure in a predetermined heat transfer pattern; and
   morphing, through the predetermined heat transfer pattern, the multifunctional cellular aerostructure where the predetermined heat transfer pattern effects a change in a shape of the shape memory alloy core and one of the first and second face members interfaces with a fluid flow over the multifunctional cellular aerostructure.

18. The method of claim 17, further comprising varying, with the graded thermal structure, the heat transferred along a length or width of the first and the second face member.

19. The method of claim 17, further comprising flowing fluid through at least one fluid passage within one or more of the first and the second face members.

20. The method of claim 17, further comprising transferring heat to the shame memory alloy core with an active or passive thermal element.

* * * * *